July 15, 1958 — H. BRETTHAUER — 2,843,832
PHOTOGRAPHIC FLASHLIGHT CONNECTION PLUG
Filed Oct. 20, 1953 — 3 Sheets-Sheet 1
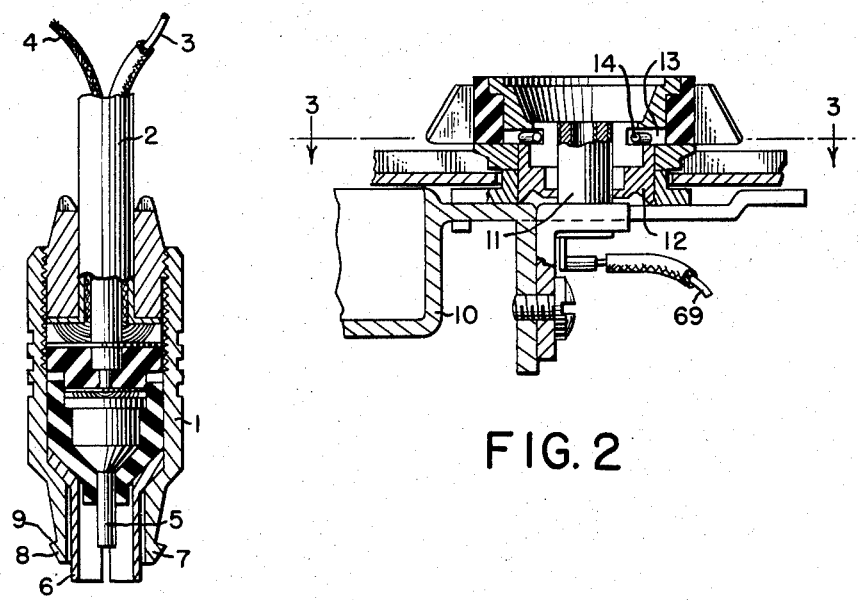
FIG. 1
FIG. 2
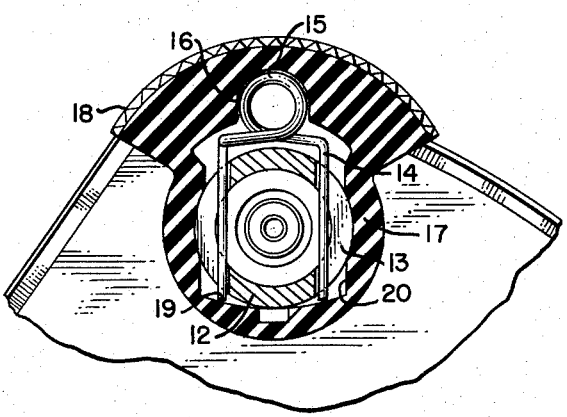
FIG. 3

July 15, 1958     H. BRETTHAUER     2,843,832
PHOTOGRAPHIC FLASHLIGHT CONNECTION PLUG Filed Oct. 20, 1953     3 Sheets-Sheet 2

July 15, 1958 — H. BRETTHAUER — 2,843,832
PHOTOGRAPHIC FLASHLIGHT CONNECTION PLUG
Filed Oct. 20, 1953 — 3 Sheets-Sheet 3

United States Patent Office 2,843,832
Patented July 15, 1958

2,843,832

PHOTOGRAPHIC FLASHLIGHT CONNECTION PLUG

Hermann Bretthauer, Braunschweig, Germany, assignor to Franke & Heidecke, Fabrik Photographischer Prazisions-Apparate, Braunschweig, Germany, a German firm Application October 20, 1953, Serial No. 387,119

Claims priority, application Germany October 23, 1952

5 Claims. (Cl. 339—91)

The present invention relates to a plug and socket connection for connecting a flashlight "gun" or other suitable photographic flashlight apparatus, to the photographic camera with which it is to be used. The plug is connected to the ends of the wires of the flashlight apparatus, and the socket for receiving the plug is mounted on the body of the photographic camera.

Certain forms of such plug and socket connections are already in wide use, with great numbers of them in the hands of the ultimate users. In practice, however, the plugs sometimes come loose from the sockets accidentally or unintentionally. If this is not noticed by the photographer, a faulty picture results because the flashlight does not fire when the camera shutter is operated.

An object of the present invention is to provide a generally improved and more satisfactory plug and socket connection, which cannot become accidentally loosened or disconnected, and yet which can be easily and quickly disconnected by the operator when desired.

Because of the large number of plug and socket connections already in use, it is not practical to provide a new form of plug and socket which are not interchangeable with the old ones (of this same general style or kind) already in use. Therefore, it is an additional object of the present invention to provide improved plug and socket connections which are interchangeable with the ones already in use, so that the new plug may be used with the old type of socket, and so that the new socket may be used with the old type of plug, in order that the photographer's existing equipment may not be rendered obsolete if he desires to use a new flashgun with an old camera or a new camera with an old flashgun. The full advantages of the present invention will not be attained unless a plug of the new style is used with a socket of the new style; nevertheless the interchangeability of the parts is important, in view of the large number of old style parts and sockets already in use.

These and other desirable objects may be attained in the manner disclosed as an illustrative embodiment of the invention in the following description and in the accompanying drawings forming a part hereof, in which:

Fig. 1 is a longitudinal section through one embodiment of new plug according to the present invention;

Fig. 2 is an axial section through the new socket according to the present invention, illustrating also fragments of the camera casing;

Fig. 3 is a section taken approximately along the line 3—3 of Fig. 2;

The same reference numerals throughout the several views indicate the same parts.

Figure 4:
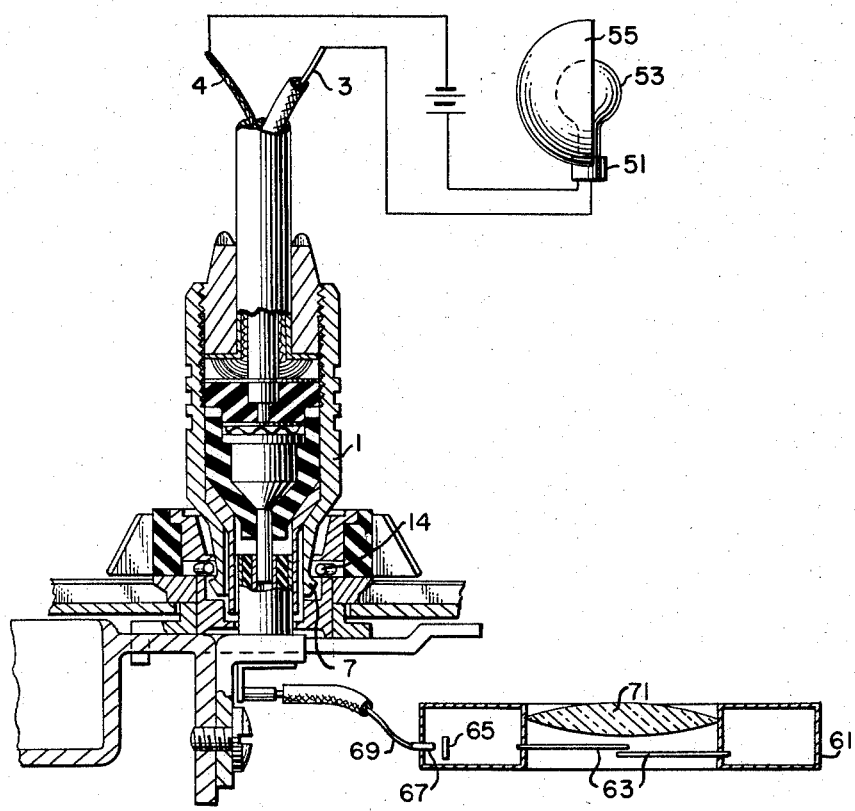
Fig. 4 is a longitudinal section through the new plug and the new socket when interengaged with each other, also showing diagrammatically certain parts of the flashgun and the camera shutter.
Figure 5:
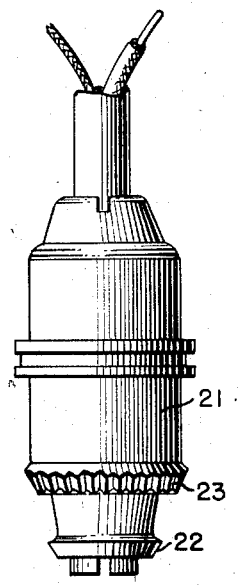
Fig. 5 is a side elevational view of the plug according to a second embodiment of the invention.
Figure 6:
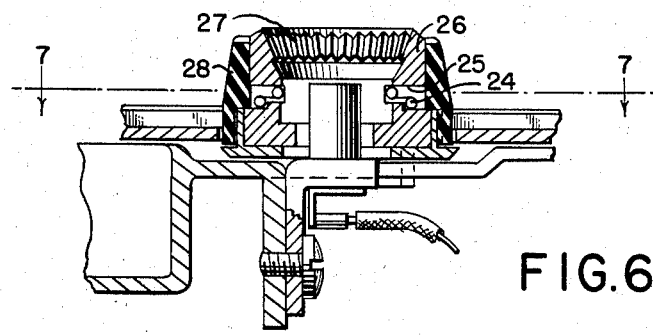
Fig. 6 is an axial section similar to Fig. 2, through a second form of socket intended to cooperate with the form of plug shown in Fig. 5.
Figure 7:
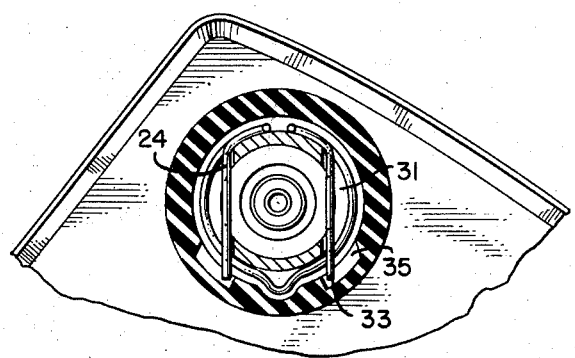
Fig. 7 is a section taken approximately along the line 7—7 of Fig. 6.
Figure 8:
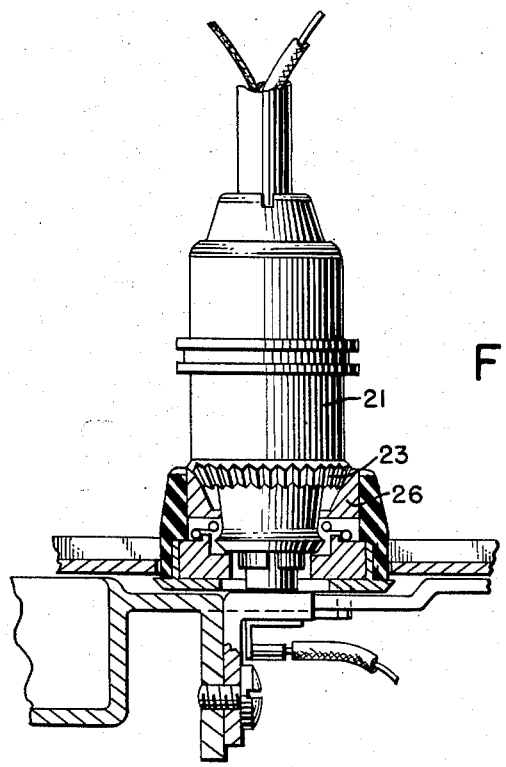
Fig. 8 is a view similar to Fig. 4 showing the second form of plug engaged with the second form of socket.

Referring now to the first form of plug as shown for example in Figs. 1 and 4, there is the usual plug body 1 connected to one end of the electrical cable 2 containing the two wires or conductors 3 and 4. As shown diagrammatically in Fig. 4, these wires 3 and 4 lead to any suitable flashgun or other photographic flash apparatus such as the socket 51 for holding a flashbulb 53 in proper relation to a reflector 55. The construction of the flashgun itself is well known. The construction of the electrical plug parts within the body 1 is also known, except for the new retaining lip herein described, and the interior construction of the plug 1 need not be further described. It is sufficient to say that the lower end of the plug 1 has a central contact pin 5, made of metal and connected to one of the circuit wires such as the wire 3. Surrounding the pin 5 and concentric therewith is a split contact sleeve 6 of metal, electrically connected to the other of the circuit wires such as the wire 4, and electrically insulated from the central pin 5.

According to the present invention, the forward end of the plug casing 1 (that is, the lower end when viewed as in Fig. 1) is provided with an external bead 7, the front face 8 of which is conical, while the rear face 9 forms an abrupt shoulder extending radially, substantially in a plane perpendicular to the longitudinal axis of the plug. This bead or enlargement 7 may be described as a locking bead or retaining bead, and the rear face 9 thereof may be described as a retaining or locking face or abutment or shoulder. In this first embodiment of the present invention, it is this bead which constitutes the difference between the present plug and the prior plugs of this same general style or kind, which are already in use in large quantities. The existence of this bead will not interfere with the new plug being properly inserted in the sockets already in use.

Referring now to Figs. 2 and 3 of the drawings, a portion of the photographic camera housing is shown at 10. Secured in fixed position on the housing is a bushing 11 of known form, containing an inner metallic sleeve into which the central contact pin 5 of the plug may be inserted by a longitudinal sliding motion, and an outer metallic sleeve to fit snugly within the split sleeve 6 of the plug, the inner and outer sleeves of the bushing 11 being electrically insulated from each other. These two sleeves are electrically connected respectively to opposite sides of the electric synchronizing circuit of the photographic shutter which is mounted on the camera body, and which is shown schematically or diagrammatically in Fig. 4. The shutter itself may be of any conventional or known form, comprising for example a casing 61 suitably mounted on the camera body 10, and having shutter blades 63 which normally close the central exposure aperture of the shutter, and having a movable electric switch contact member 65, which, by known mechanism mounted within the shutter casing, is brought into contact with a fixed switch contact member 67 in proper timed relationship to the opening of the shuter blades 63, when an exposure is to be made. The electric wire 69 extends from the switch contact 67 to one of the sleeves of the bushing 11, while the other switch contact 65 is suitably connected to the second sleeve of the bushing 11, either by a similar wire or by being grounded to suitable metal parts of the shutter and of the camera body. A suitable lens 71 is mounted in the shutter 61, to project light into the camera body 10 when the shutter blades 63 are opened.

The camera body socket for receiving the electrical connector plug 1 comprises, in addition to the above mentioned bushing 11, a stationary housing ring 12 surrounding the bushing 11 and having a flared or conical outer end or mouth as seen in Fig. 2, to assist easy entrance of the plug. The housing ring 12 is formed with two tangential slots 13 substantially in a plane perpendicular to the axis of the structure, which slots 13 receive the two arms 14 of a spring of the hairpin type, the arms being connected to each other by a looped portion 15 which lies in a recess 16 of another sleeve 17 which is rotatable around the outside of the main sleeve 12. The spring-receiving slots 13 are of such shape and dimensions that they hold the spring arms 14 apart at a distance substantially equal to the external diameter of the plug 1 just behind the retaining shoulder 9, but they allow the spring arms to be moved farther apart by flexing the spring.

If the plug 1 is now inserted into the socket formed in part by the bushing 11 and the sleeve 12, the central pin 5 of the plug will slide snugly within the inner sleeve of the bushing 11, the contact sleeve 6 of the plug will slide snugly and externally along the outer sleeve of the bushing 11, and the advancing forward end of the plug will engage the spring arms 14, whereupon the conical forward surface 8 will spread the spring arms apart until the plug reaches its home position whereon the spring arms will snap behind the locking shoulder 9 of the plug and prevent the plug from being accidentally removed from the socket. The parts will now be in the position shown in Fig. 4.

When it is desired to remove the plug from the socket, in order to disconnect the flashgun or other flashlight apparatus from the camera, then the outer sleeve 17 is slightly turned, for example by finger pressure on a projecting flange 18 of the sleeve, which is provided with knurling or roughening for convenient frictional engagement by the operator's fingers. If the parts 17, 18 are turned in either direction relative to the stationary sleeve 12, the corresponding rotary motion imparted to the loop 15 of the spring will tend to carry the entire spring in one direction or the other around the sleeve 12 and, by engagement of the spring arms with the sleeve 12, will cam the spring arms apart and serve to open up the arms slightly so as to release the retaining shoulder 9 of the plug, allowing the plug to be drawn axially out of the socket. The extent of possible turning motion of the sleeve 17 is limited by engagement of the ends 19 of the spring with recesses 20 in the sleeve 17.

The second embodiment of the invention, illustrated in Figs. 5–8, may be the same as the first embodiment except for the differences pointed out below. In this second embodiment, the plug body 21 is the same as the plug body 1 of the previous embodiment, and has the same bead 22 corresponding to the previously mentioned bead 7 and having the same conical forward face and radial rear face to constitute a locking shoulder. The difference between this and the previous body is that, in the second embodiment, the body 21 is provided with a ring of teeth 23 extending circumferentially around the body a little behind the locking bead 22.

The inner housing ring 26, in this second embodiment, is rotatable on the camera casing, rather than being stationary, and it is surrounded and guided by the stationary ring or socket housing 28, which forms a bearing within which the member 26 may rotate. The outer end of the rotatable ring 26 is flared in a manner similar to the previous embodiment, and is provided with teeth 27 extending circumferentially and arranged at an angle or inclination equal to the beveled angle or inclination of the teeth 23 on the plug 21, so that the teeth 23 will engage and mate with the teeth 27 in order to transmit rotary motion from the plug 21 to the member 26.

The spring 24, similar to the spring 14 of the previous embodiment, lies in the tangential slots 31 formed in the rotary socket member 26, and has ends 33 which project into recesses 35 in the stationary socket housing 28 to limit the extent of rotation of the parts.

Just as in the previous embodiment, the plug is inserted endwise or in an axial direction in the socket, when it is desired to connect the flashlight apparatus operatively to the photographic camera, the axial movement being continued until the arms of the spring 24 are spread apart by the conical forward face of the retaining bead 22, and then snapped behind the radial rear face of the bead, to hold the plug against accidental dislodgement from the socket. When it is desired to disconnect the flashlight apparatus from the camera, the plug 21 is grasped and turned slightly in one direction or the other. Due to the engagement of the teeth 23 with the teeth 27, the turning movement of the plug will be transmitted to the socket member 26, and the rotation of the socket member 26 will tend to turn the spring 24 with it, until one or the other of the ends 33 of the spring comes into engagement with the end of its recess 35, whereupon continued turning movement will flex the spring arm to bend it outwardly away from the shank of the plug 21, releasing the spring from behind the retaining bead 22. Then the plug can be pulled axially out of the socket.

In both embodiments, the previous form of plug (of this same general style) can be used with the new socket, and the previous form of socket can be used with the new plug, so that interchangeability is achieved even though the full advantages of the present invention are not attained unless the new form of plug and the new form of socket are used together.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims. For example, it is within the scope of the invention to provide special actuating grips or other suitable means for opening up one or both arms of the spring in order to release the plug, without necessarily using rotary parts as herein described in the preferred forms of the invention.

What is claimed is:

1. A separable connector for connecting an electric switch of a photographic camera to a flashlight, said connector including a plug having an insulating body and two electrical contacts mounted in said body and connected to said flashlight, a socket mounted on said camera in position to receive said plug therein and having two electrical contacts connected to said switch and positioned to mate with said contacts on said plug when said plug is inserted in said socket, a spring mounted in said socket and having two arms substantially parallel to each other and arranged substantially tangentially to said plug on opposite sides thereof when said plug is inserted in said socket, and an annular bead on said plug having a conical forward face to engage said spring arms and displace them laterally while said plug is being inserted in said socket and having an abrupt substantially radial rear face to engage said spring arms and to be retained thereby against removal outwardly from said socket until said spring arms have been displaced, said socket including a fixed member and a rotary member arranged concentrically with respect to each other, said two members having means for spreading said spring arms laterally when one of said members is turned relative to the other, both of said members remaining with said socket when said plug is removed from said socket.

2. The combination with a body, of electric socket means mounted on said body, electric plug means detachably connectible to said socket means by a longitudinal axial movement into said socket means, cooperating electrical conducting parts carried by said socket means and said plug means for contacting with each other to establish an electric connection between said plug means and said socket means when said plug means is inserted in normal operative position in said socket means, a shoulder extending circumferentially around said plug means, a spring member mounted on said body and having two arms lying approximately parallel to each other and approximately in a common plane perpendicular to the longitudinal axis of said socket means for engaging said shoulder on said plug means to tend to retain said plug means in said socket means, and two annular elements mounted on said body and remaining attached to the body when said plug means is removed from said socket means, one of said annular elements surrounding the other annular element and the spring member, one of the annular elements being non-rotatably anchored to said body and the other being rotatable about the longitudinal axis of said plug means and socket means, one of said elements engaging said spring member at one point and the other element engaging said spring member at another point in such manner as to spread said arms of said spring member upon predetermined rotation of said rotatable one of said two elements, to move said spring member to disengage it from said shoulder of said plug means so that said plug means may be withdrawn longitudinally from said socket means.

3. The combination with a body, of electric socket means mounted on said body, electric plug means detachably connectible to said socket means by a longitudinal axial movement into said socket means, cooperating electrical conducting parts carried by said socket means and said plug means for contacting with each other to establish an electric connection between said plug means and said socket means when said plug means is inserted in normal operative position in said socket means, a shoulder extending circumferentially around said plug means, a spring member held to said body against substantial axial movement relative to said socket means and having two spaced arms lying on opposite sides of said plug means for engaging said shoulder on said plug means to tend to retain said plug means in said socket means, said arms being capable of being spread away from each other to release said plug means for removal from said socket means, a fixed element and a rotary element both mounted on said body in surrounding relation to said socket means and remaining attached to the body when said plug means is removed from said socket means, said fixed and rotary elements respectively reacting against said spring member at spaced points and being effective, upon predetermined rotation of said rotary element, to spread said arms of said spring member so that said plug means may be withdrawn longitudinally from said socket means, and means for rotating said rotary element to spread said arms of said spring member to release said plug means for longitudinal withdrawal from said socket means.

4. A construction as defined in claim 3, in which said means for rotating said rotary element comprises a flange on said rotary element having a roughened periphery for direct engagement by an operator's finger to turn said rotary element, said rotary element and its said flange being mounted on said body and remaining therewith when said plug means is removed from said socket means.

5. A construction as defined in claim 3, in which said means for rotating said rotary element comprises teeth on said rotary element, said teeth being arranged substantially concentrically around the longitudinal axis of said socket means, and interengaging teeth on said plug means for engaging in driving relation with said first mentioned teeth when said plug means is in normal connected position with relation to said socket means, so that when in said connected position said plug means may be grasped and turned about said longitudinal axis, and the turning movement thereof will be transmitted through the teeth to said rotary element to rotate the same to spread said arms of said spring member to release said plug means for withdrawal from said socket means.

References Cited in the file of this patent

UNITED STATES PATENTS

| | | |
|---|---|---|
| 1,631,191 | Champion | June 7, 1927 |
| 2,289,172 | Beal | July 7, 1942 |
| 2,401,817 | Dina | June 11, 1946 |
| 2,448,725 | Morris | Sept. 7, 1948 |
| 2,584,528 | Alexander | Feb. 5, 1952 |
| 2,622,496 | Owens | Dec. 23, 1952 |
| 2,749,819 | Weiss | June 12, 1956 |